Oct. 18, 1949.  F. FRIEDHEIM  2,485,440
AUXILIARY GLARE SHIELD
Filed Feb. 14, 1947
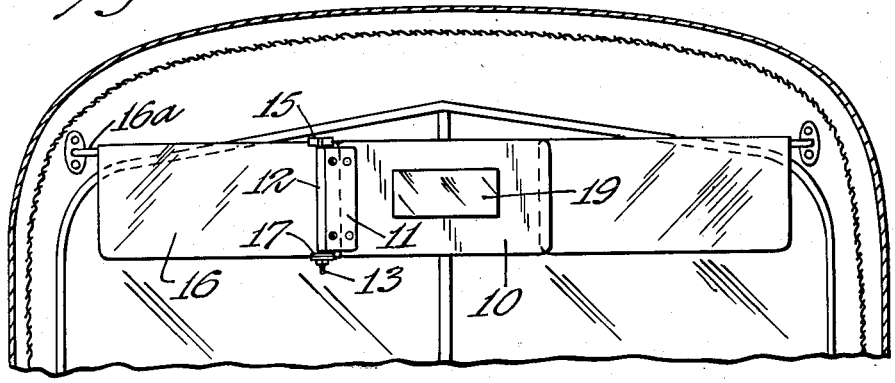
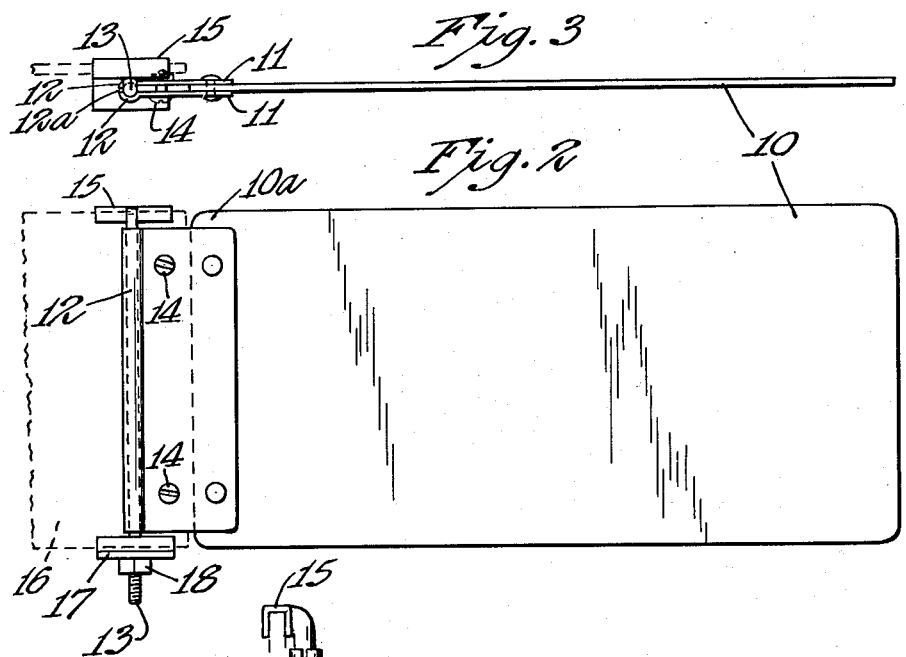
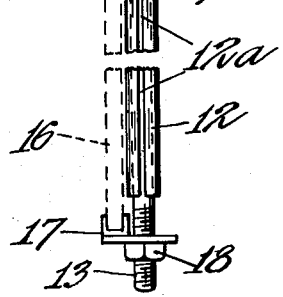
Inventor
Frank Friedheim
By Williamson & Williamson
Attorneys Patented Oct. 18, 1949

2,485,440

UNITED STATES PATENT OFFICE 2,485,440

AUXILIARY GLARE SHIELD

Frank Friedheim, Minneapolis, Minn.

Application February 14, 1947, Serial No. 728,555

2 Claims. (Cl. 296—97)

This invention relates to auxiliary glare shields for automobiles adapted to supplement and materially improve the facilities afforded by the main glare shields.

Most automobiles today are provided with glare shields or "sun visors" to protect the driver's eyes from glare. Some automobiles have one glare shield in front of the driver while others have a pair of them, one in front of the driver and the other in front of the seat next to the driver. Very often direct rays from the sun approach the car at such an angle that the present shields fail to protect the driver. My auxiliary glare shield is adapted to be attached on the inner end portion of one of the main glare shields and to extend inwardly from said main shield to which it is attached, protecting an area heretofore left unprotected between the two main shields or adjacent the inner end of a single shield. By providing a hinged connection between said main and auxiliary shields, said auxiliary shield may be adjusted to block the glare from angularly disposed rays from the sun. When the sun's rays approach from the side of the car, this auxiliary shield may be swung on its hinged axis so as to be angularly disposed with relation to the main glare shield and protect the driver from the glare of the sun's rays.

It is an object of my invention to provide a novel and simple auxiliary glare shield adapted to be attached to a main glare shield and to provide supplemental protection for the main shields at various angulated positions.

It is another object to provide an auxiliary glare shield comprising a panel and means for attaching said panel to the main shield, said means permitting angular adjustment of said auxiliary shield at substantially right angles to the horizontal axis of the main shield, which in conjunction with the angular adjustment of the main shield permits universal adjustment of the auxiliary shield.

It is still another object to provide an auxiliary glare shield adapted for hinged attachment to a main glare shield and having a mirror fixed on one surface of said shield adapted for use as a rear vision mirror and being universally adjustable by a horizontally hinged mounting of said main shield and said hinged attachment of said auxiliary shield thereto.

The objects and advantages of the invention will more fully appear from the following description made in connection with the accompanying drawings wherein like reference characters refer to similar parts throughout the various views and in which:

Fig. 1 is an elevational view as viewed from the rear of an automobile showing my auxiliary shield attached to a main shield mounted over the windshield of said automobile;

Fig. 2 is an elevation view showing the shield and the attachment clamp in detail;

Fig. 3 is a plan view showing the top edge of said auxiliary shield and clamp in detail; and Fig. 4 is an end elevational view showing the attachment clamp as attached to a main shield.

As illustrated in Figs. 1 through 4, I provide an elongated panel 10 having a pair of bracket members 11 fixed as by riveting to one end 10a of said panel as shown in Figs. 2 and 3. The bracket members 11 lie on opposite sides of the panel 10 and extend outwardly from the end thereof. An outwardly protruding bead is formed adjacent the free edge of said brackets 11 forming grooves 12 in the inner surface of said brackets 11. The brackets 11 lie in spaced side-by-side substantially parallel relationship, and the grooves 12 of the opposing brackets cooperate to form a split cylinder 12a. An elongated clamp rod 13 fits into cylinder 12a and is embraced thereby. The spaced brackets 11 in the form shown have a pair of aligned apertures therethrough and are held against rod 13 as by screws 14 through said apertures, said screws permitting adjustment of the frictional resistance to movement about rod 13 as an axis. Also as the rod 13 and the inner surface of cylinder 12a wear, these screws 14 serve to tighten the cylinder against the rod and take up this wear. Said cylinder 12a and rod 13 cooperate to form a hinged coupling on which said panel 10 may be swung.

An attachment clamp is formed by fixing a clip 15 onto the top extremity of the clamp rod 13 which is adapted to fit over and embrace the top horizontal edge portion of a main glare shield 16 in an automobile adjacent the inner end which extends at substantially right angles to said horizontal edge of said main shield. A slidable clip 17 similar in shape to clip 15 has an aperture therethrough and fits over the lower end of clamp rod 13, which is provided with threads and a nut 18 adapted to cooperate therewith.

To install my auxiliary glare shield onto a main shield of an automobile, the main shield, which is hinged horizontally on axis 16a, is swung down so that it extends substantially vertically below its horizontal axis 16a. The clip 15 is fitted over the top horizontal edge near the inner end thereof, the clamp rod 13 and the brackets 11 being disposed adjacent the inner surface of the main shield 16 in its downward position. The slidable clip 17 is then fitted over the lower horizontal edge near the inner end of main shield 16 and the nut 18 is tightened against said clip 17, clamping clips 15 and 17 tightly against the inner end portions of the two horizontal edges of the main shield. It will be noted that the adjustable clamp here provided is adapted to fit various width main shields.

Operation

The unprotected area adjacent the inner end of main shield 16 can be covered by swinging panel 10 outwardly into substantial alignment with main shield 16 and shielding said unprotected area. The panel 10 is hinged about the rod 13, which is disposed at right angles to the horizontal axis 16a of the main shield and it will be seen that the combination of these two hinged connections about these two axes 16a and 13 will provide universal adjustment for auxiliary anti-glare panel 10 to any desired position. Also anti-glare panel 10 may be swung through one hundred eighty degrees and folded back to lie against the inner surface of main shield 16 when shield 16 is in downward position and to swing upwardly with shield 16 when not in use. In the event that there is only one main shield mounted in the automobile, the panel 10 will obviate the necessity for a second main shield in protecting the driver. By swinging the main shield 16 down in front of the driver and angularly adjusting the panel 10 with relation thereto it will be seen that any rays from the sun coming toward the automobile from an angle to the right can be blocked by properly adjusting the panel 10.

I provide a rear vision mirror 19 fixed on the inner surface of panel 10 when in downward and outwardly extended position, which obviously would be required in view of the fact that the auxiliary shield completely covers the standard rear vision mirror from the inside of the automobile. It will be seen that rear vision mirror 19 can be adjusted to any position by swinging the shield 16 and panel 10 on their respective axes 16a and 13.

Also it will be seen that my auxiliary shield 10 may be clamped on to the outer end of main shield 16 to provide protection from the sun's rays coming from the left while main shield 16 protects the driver from rays coming from ahead.

From the above description and accompanying drawings it will be seen that I have provided an inexpensive, simple, and highly efficient auxiliary glare shield to protect automobile drivers, which is adapted to be swung into any desired position and which is provided with a rear vision mirror to enable the driver to keep a watch behind him, said mirror also being adjustable to any position on the axes 16a and 13. The clips 17 and 15 on clamping rod 13 are adjustably spaced to adapt the attachment clamp to fit various width main glare shields and the screws 14 are provided to adjust the frictional resistance to swinging movement about axis 13.

It will of course be understood that various changes may be made in the form, details arrangement, and proportion of the various parts without departure from the scope of the present invention which, generally stated, consists in the matter shown and described and set forth in the appended claims.

I claim:

1. For attachment to a main glare shield for an automobile, an auxiliary glare shield having in combination an attachment clamp comprising an elongated interconnection rod, a pair of spaced clamps respectively mounted on the end portions of said rod for engagement with the outer end portions of the horizontal edges of said main glare shield, at least one of said clamping elements being shiftable on said rod to permit the spaced relation of said elements to be varied, and means for positively shifting said shiftable element on said rod to tightly clamp said rod on said main glare shield at right angles to the horizontal edge portions of said main shield; an anti-glare panel, a friction hinge element fixed at one end of said panel and frictionally embracing said rod to permit said panel to be swung about said rod as an axis and set at any angulation relative to said main glare shield.

2. For attachment to a main glare shield of an automobile, an auxiliary glare shield having in combination an attachment clamp comprising an interconnection rod adapted to be disposed at right angles to the horizontal edges of said main glare shield, a pair of spaced clamping elements respectively mounted on the end portions of said rod for engagement with the outer end portions of the horizontal edges of said main glare shield, at least one of said clamping elements being shiftable on said rod to permit the spaced relation between said elements to be varied, and means for positively shifting said shiftable element to tightly clamp said elements together on the outer end portion of said main shield; an anti-glare panel, a pair of inwardy extending opposed brackets fixed at one end thereof on respectively opposite faces thereof, said brackets having opposed cooperating rod embracing grooves respectively formed at the inner edge portions thereof, said grooves receiving said interconnection rod therein to embrace said rod and to combine therewith to form a friction hinge, and friction adjustment means interconnecting intermediate portions of said brackets for adjustably varying the frictional resistance of said hinge, to permit said anti-glare panel to be set at any adjusted angulation relative to said main glare shield.

FRANK FRIEDHEIM.

REFERENCES CITED

The following references are of record in the file of this patent:

UNITED STATES PATENTS

| Number | Name | Date |
|---|---|---|
| 2,020,585 | Stansberry | Nov. 12, 1935 |
| 2,070,208 | Kelly | Feb. 9, 1937 |
| 2,276,585 | Mandel | Mar. 17, 1942 |